(12) United States Patent
Harada

(10) Patent No.: US 12,676,295 B2
(45) Date of Patent: Jul. 7, 2026

(54) GAS CHROMATOGRAPH MASS SPECTROMETER

(71) Applicant: SHIMADZU CORPORATION, Kyoto (JP)

(72) Inventor: Shigetoshi Harada, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 488 days.

(21) Appl. No.: 18/015,887

(22) PCT Filed: Apr. 27, 2021

(86) PCT No.: PCT/JP2021/016773
§ 371 (c)(1),
(2) Date: Jan. 12, 2023

(87) PCT Pub. No.: WO2022/014119
PCT Pub. Date: Jan. 20, 2022

(65) Prior Publication Data
US 2023/0243787 A1 Aug. 3, 2023

(30) Foreign Application Priority Data
Jul. 14, 2020 (JP) ................................ 2020-120450

(51) Int. Cl.
*H01J 49/14* (2006.01)
*G01N 27/62* (2021.01)
(Continued)

(52) U.S. Cl.
CPC ......... *G01N 30/7206* (2013.01); *G01N 27/62* (2013.01); *H01J 49/14* (2013.01); *H01J 49/426* (2013.01); *G01N 2030/025* (2013.01)

(58) Field of Classification Search
None
See application file for complete search history.

(56) References Cited

U.S. PATENT DOCUMENTS

2009/0090862 A1* 4/2009 Kawana .............. H01J 49/0468
250/288

FOREIGN PATENT DOCUMENTS

JP 2002329475 A * 11/2002
JP 2005147684 A * 6/2005
(Continued)

OTHER PUBLICATIONS

Communication dated Aug. 30, 2024 in Chinese Application No. 202180049657.5.
(Continued)

*Primary Examiner* — James Choi
(74) *Attorney, Agent, or Firm* — Sughrue Mion, PLLC

(57) ABSTRACT
A gas chromatograph mass spectrometer includes a gas chromatograph part including a separation column, a mass spectrometer part, and a controller configured to control at least an ionization part of the mass spectrometer part. The ionization part includes an ion source box having a space for ionizing the components flowing out from an outlet of the separation column in the inside, a heater for adjusting a temperature of an ion source box, and a filament that is arranged outside of the ion source box and generates an electron for ionizing the components flowing out from the outlet of the separation column. The controller is configured to, after applying voltage to the filament, adjust a temperature of the ion source box affected by heat emitted from the filament to a predetermined temperature by controlling output of the heater in relation to magnitude of heat generation of the filament.

4 Claims, 2 Drawing Sheets

(51) Int. Cl.
_G01N 30/72_ (2006.01)
_H01J 49/42_ (2006.01)
_G01N 30/02_ (2006.01)

(56) References Cited

FOREIGN PATENT DOCUMENTS

| | | |
|----|----------------|--------|
| JP | 2019-007927 A | 1/2019 |
| WO | 2007/102224 A1 | 9/2007 |
| WO | 2016/092696 A1 | 6/2016 |

OTHER PUBLICATIONS

International Search Report for PCT/JP2021/016773 dated Jul. 6, 2021.
Written Opinion for PCT/JP2021/016773 dated Jul. 6, 2021.
Office Action issued Sep. 5, 2023 in Japanese Application No. 2022-536141.

* cited by examiner

GAS CHROMATOGRAPH MASS SPECTROMETER

CROSS REFERENCE TO RELATED APPLICATIONS

This application is a National Stage of International Application No. PCT/JP2021/016773 filed Apr. 27, 2021, claiming priority based on Japanese Patent Application No. 2020-120450 filed Jul. 14, 2020.

TECHNICAL FIELD

The present invention relates to a gas chromatograph mass spectrometer.

BACKGROUND ART

A gas chromatograph mass spectrometer includes a gas chromatograph part that separates a component in sample gas by a separation column, and a mass spectrometer part that ionizes the component separated by the gas chromatograph part and performs analysis by using a ratio m/z of a mass m of the ionized component to charge z (see Patent Document 1).

As one of systems for ionizing a component separated by the gas chromatograph part, an electron ionization (EI) method is known. The EI method is a method of ionizing a component from the gas chromatograph part by colliding a thermoelectron with the component. An ionization part employing the EI method is provided with a metal box called an ion source box, and a filament and an emission electrode are arranged outside the ion source box with the ion source box interposed between them. When voltage is applied to the filament, a thermoelectron is generated in the filament, and the thermoelectron moves across the interior of the ion source box toward the emission electrode. At this time, the thermoelectron collides with a component from the gas chromatograph part released into the ion source box, so that the component from the gas chromatograph part is ionized.

A sample injected into the gas chromatograph part contains a solvent, and a solvent component comes out of the gas chromatograph part before a component to be analyzed. It has been found that if voltage is applied to the filament while a solvent component from the gas chromatograph part is released into the ion source box, the filament is damaged. Therefore, in general, voltage application to the filament is started after release of a solvent component from the gas chromatograph part into the ion source box is completed.

PRIOR ART DOCUMENT

Patent Document

Patent Document 1: Japanese Patent Laid-open Publication No. 2019-007927

SUMMARY OF THE INVENTION

Problems to be Solved by the Invention

The temperature of the ion source box affects ionization efficiency in the ion source box. For this reason, a heater and a temperature sensor are attached to the ion source box, and control such as feedback control is performed so that the temperature of the ion source box is maintained at a set temperature.

When voltage application to the filament is started after release of a solvent component from the gas chromatograph part into the ion source box is completed, the temperature of the ion source box increases under the influence of heat emitted from the filament. There has been a problem that, even in a case where the temperature of the ion source box is feedback-controlled, it is inevitable that the temperature of the ion source box temporarily rises to a temperature higher than a set temperature, and ionization efficiency fluctuates during that time.

The present invention has been made in view of the above problem, and an object thereof is to improve temperature stability of the ion source box.

Solutions to the Problems

A gas chromatograph mass spectrometer according to the present invention includes a gas chromatograph part configured to generate sample gas from an injected sample and to separate components in the sample gas from each other by a separation column, a mass spectrometer part including an ionization part for ionizing the components flowing out from an outlet of the separation column of the gas chromatograph part and a detection part for detecting the components ionized in the ionization part, and a controller configured to control at least the ionization part. The ionization part of the mass spectrometer part includes an ion source box having a space for ionizing the components flowing out from the outlet of the separation column in the inside, a heater for adjusting a temperature of the ion source box, and a filament that is arranged outside of the ion source box and emits an electron for ionizing the components to the space, and the controller is configured, after applying voltage to the filament, to adjust a temperature of the ion source box affected by heat emitted from the filament to a predetermined temperature by controlling output of the heater in relation to magnitude of heat generation of the filament.

Here, controlling output of the heater "in relation to magnitude of heat generation of the filament" includes controlling output of the heater based on any of the magnitude of voltage applied to the filament, the magnitude of current flowing through the filament, and the magnitude of emission current.

Effects of the Invention

According to the gas chromatograph mass spectrometer of the present invention, temperature of the ion source box affected by heat emitted from the filament is adjusted to a predetermined temperature by controlling output of the heater in relation to the magnitude of heat generation of the filament after voltage is applied to the filament, so that temperature stability of the ion source box is improved.

EMBODIMENT OF THE INVENTION

Hereinafter, an embodiment of the gas chromatograph mass spectrometer according to the present invention will be described with reference to the drawings.

Figure 1:
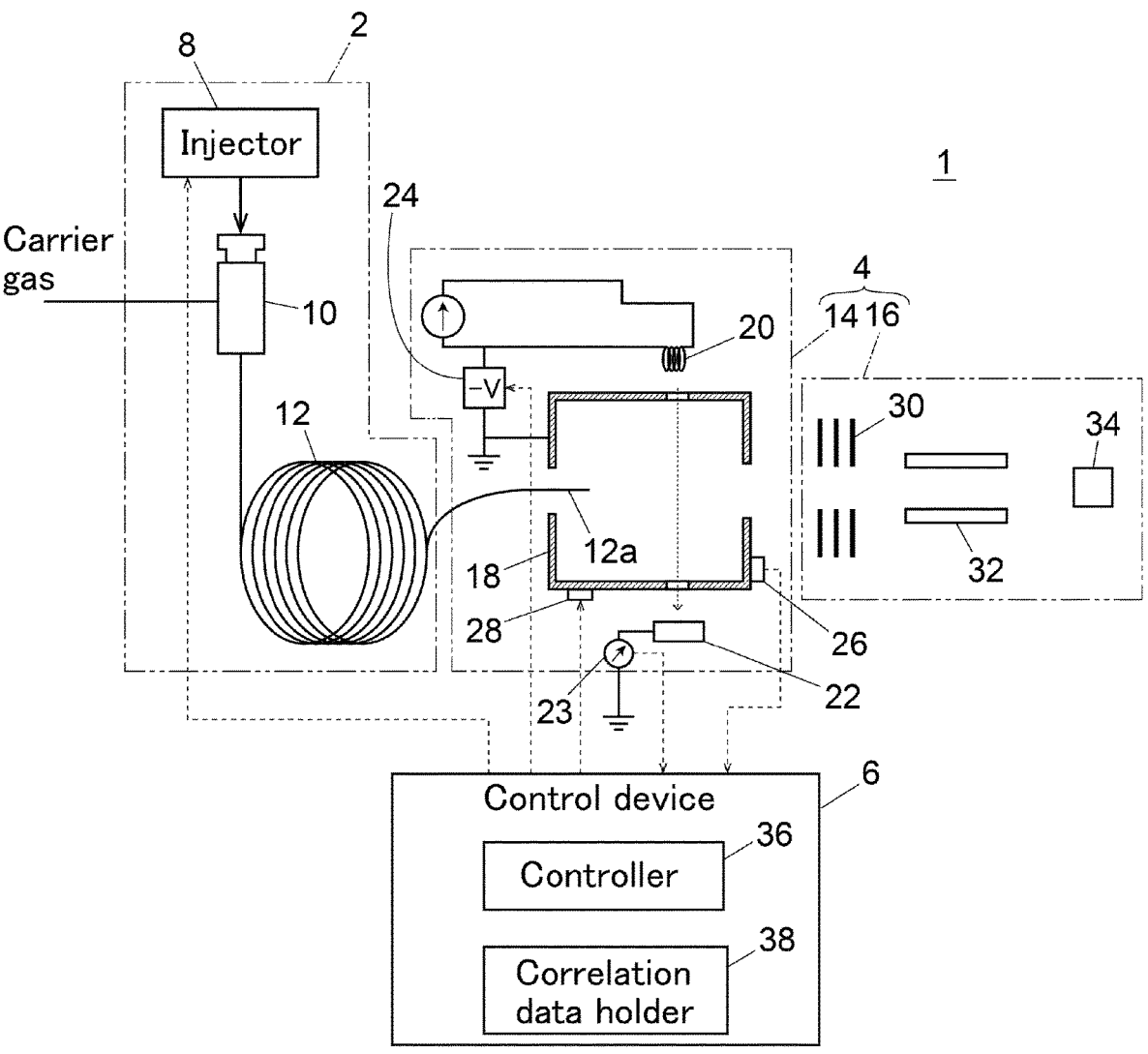
FIG. 1 is a schematic configuration diagram illustrating an embodiment of a gas chromatograph mass spectrometer.

As illustrated in FIG. 1, a gas chromatograph mass spectrometer 1 includes a gas chromatograph part 2, a mass spectrometer part 4, and a control device 6. The mass spectrometer part 4 includes an ionization part 14 and a detection part 16. Note that the gas chromatograph part 2 and the mass spectrometer part 4 are accommodated in a housing (not illustrated), and at least the mass spectrometer part 4 is placed in a vacuum state.

The gas chromatograph part 2 includes an injector 8, a sample vaporizing part 10, and a separation column 12. The injector 8 collects a sample from a sample vial (not illustrated) and injects the sample into the sample vaporizing part 10. The sample vaporizing part 10 vaporizes a sample injected by the injector 8 to generate sample gas, and carries the sample gas to the separation column 12 by carrier gas. In the separation column 12, a component in the sample gas is separated. An outlet 12a of the separation column 12 is arranged in an ion source box 18 of the ionization part 14 described later, and a component separated in the separation column 12 is released into a space in the ion source box 18.

The ionization part 14 of the mass spectrometer part 4 includes the ion source box 18, a filament 20, an emission electrode 22, an ammeter 23, an ionization power supply 24, a temperature sensor 26, and a heater 28. The ion source box 18 is a metal box, and a component from the outlet 12a of the separation column 12 is released into a space inside the ion source box 18. The filament 20 and the emission electrode 22 are arranged outside the ion source box 18 in a manner sandwiching the ion source box 18 between them. The ionization power supply 24 is for applying voltage to the filament 20. The temperature sensor 26 and the heater 28 are attached to the ion source box 18 to adjust the temperature of the ion source box 18.

The filament 20 is for generating an electron for ionizing a component molecule released from the outlet 12a of the separation column 12. An electron generated in the filament 20 passes through a space in the ion source box 18 toward the emission electrode 22 and collides with a component molecule emitted from the outlet 12a of the separation column 12, so as to ionize the component molecule. The ammeter 23 is for detecting an amount of electrons reaching the emission electrode 22 as emission current. In general, voltage applied to the filament 20 by the ionization power supply 24 is controlled such that emission current detected by the ammeter 23 is constant at a predetermined value.

The detection part 16 of the mass spectrometer part 4 includes an ion lens 30, a quadrupole mass filter 32, and an ion detector 34. A component ionized in the ion source box 18 of the ionization part 14 is introduced into the quadrupole mass filter 32 through the ion lens 30, and only ions having a mass-to-charge ratio corresponding to voltage applied to the quadrupole mass filter 32 pass through the quadrupole mass filter 32 and are detected by the ion detector 34.

The control device 6 is for controlling operation of the gas chromatograph part 2 and the mass spectrometer part 4, and is realized by a computer circuit including a central processing part (CPU) and an information storage device. The control device 6 includes a controller 36 and a correlation data holder 38. The controller 36 is a function obtained by the CPU executing a program, and the correlation data holder 38 is a function realized by a partial storage area of the information storage device.

The controller 36 is configured to maintain the temperature of the ion source box 18 at a predetermined temperature by controlling output of the heater 28 in consideration of the influence of heat generated from the filament 20. In the present embodiment, the correlation between the magnitude of current flowing through the filament 20 and a correction amount of output of the heater 28 necessary for canceling the influence on the temperature of the ion source box 18 from the filament 20 is defined by an experiment performed in advance, and data of the correlation is held in the correlation data holder 38.

Figure 2:
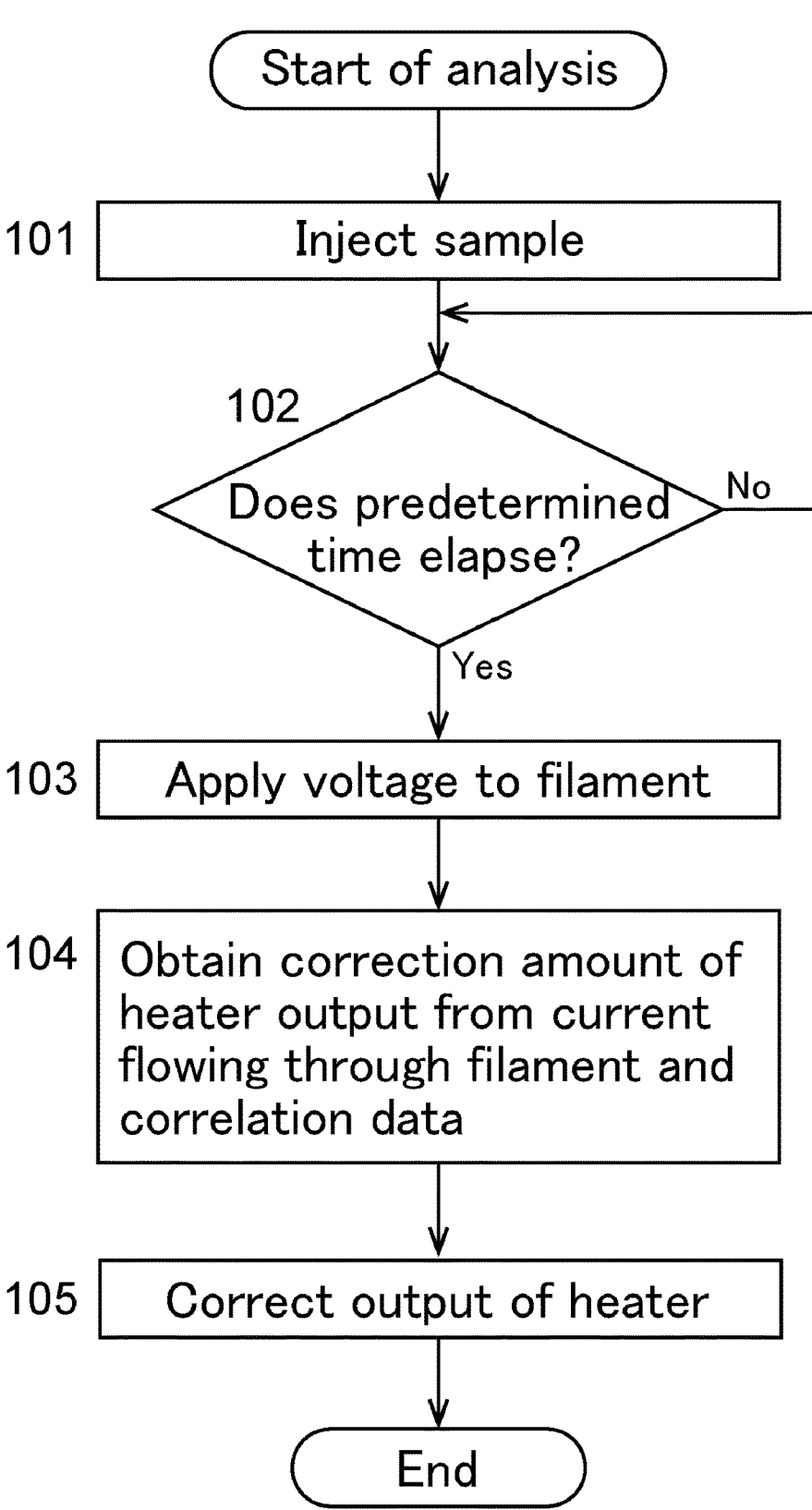
FIG. 2 is a flowchart illustrating an example of temperature control of an ion source box at the time of analysis in the embodiment.

The temperature control of the ion source box 18 at the time of analysis realized by the controller 36 will be described with reference to FIG. 1 and a flowchart of FIG. 2.

At a stage before analysis is started, the controller 36 controls output of the heater 28 so that the temperature of the ion source box 18 becomes a set temperature, and controls the ionization power supply 24 so that no voltage is applied to the filament 20. Note that the control of output of the heater 28 is performed by adjusting effective voltage applied to the heater 28.

When analysis is started, an instruction to inject a sample is transmitted from the control device 6 to the injector 8, and the injector 8 injects a sample into the sample vaporizing chamber 10 (Step 101). The controller 36 starts application of voltage to the filament 20 after a predetermined time elapses after the sample injection is performed (Steps 102 and 103). Time until the voltage application to the filament 20 is started after the sample injection is performed is time until all the solvent components contained in the injected sample are released from the outlet 12a of the separation column 12, and is determined by internal capacity from the sample vaporizing chamber 10 to the outlet 12a of the separation column 12 and a flow rate of carrier gas.

After the voltage application to the filament 20 is started, the controller 36 monitors the magnitude of current flowing through the filament 20, and uses the magnitude of current flowing through the filament 20 and correlation data held in the correlation data holder 38 to obtain a correction amount of temperature control of the ion source box 18 necessary to cancel a rising temperature of the ion source box 18 due to heat emitted from the filament 20 (Step 104). Then, the controller 36 corrects a control amount (output of the heater 28) of temperature control of the ion source box 18 using the obtained correction amount (Step 105). In practice, the temperature of the ion source box 18 gradually increases for a certain period of time after the voltage application to the filament 20 is started. Therefore, the controller 36 gradually reduces effective voltage applied to the heater 28 so as to cancel the temperature rise of the ion source box 18 using the correction amount obtained from the magnitude of current flowing through the filament 20.

Note that, since temperature fluctuation of the ion source box 18 occurs in relation to a calorific value of the filament 20, correction of output of the heater 28 can be performed based on the magnitude of voltage applied to the filament 20 or the magnitude of emission current in relation to a calorific value of the filament 20. In particular, since current flowing through the filament 20 is controlled so that emission current, which is an amount of electrons emitted from the filament 20, becomes constant, emission current detected by the ammeter 23 can be used to correct output of the heater 28. In this case, the correlation data holder 38 holds correlation data between the magnitude of emission current acquired in advance by an experiment and a correction amount of temperature control necessary for canceling the influence on the ion source box 18.

An experiment performed by the present inventor show that a mode of a temperature change of the ion source box 18 after voltage application to the filament 20 is started is reproducible. Therefore, by measuring the magnitude of voltage applied to the filament 20 and a pattern of a temperature change of the ion source box 18 in advance, it is possible to predict how the temperature of the ion source box 18 changes after voltage starts to be actually applied to the filament 20.

In general, in order to maintain the temperature of the ion source box 18 at a set temperature, feedback control of output of the heater 28 based on a signal of the temperature sensor 26 is performed. However, when feedback control of output of the heater 28 based on a signal of the temperature sensor 26 is performed even after voltage is applied to the filament 20, the temperature of the ion source box 18 exhibits a behavior of temporarily rising and then returning to a set temperature, and ionization efficiency fluctuates although temporarily. On the other hand, in the gas chromatograph mass spectrometer 1 of the present embodiment, how the temperature of the ion source box 18 changes after voltage is applied to the filament 20 of the ionization part 14 is predicted in advance, and output of the heater 28 is reduced before the temperature of the ion source box 18 actually rises, so that temperature stability of the ion source box 18 can be improved as compared with simple feedback control of output of the heater 28.

Note that when the voltage application to the filament 20 is stopped, the temperature of the ion source box 18 decreases contrary to when the voltage application to the filament 20 is started. At this time, similarly to when the voltage application to the filament 20 is started, temperature decrease of the ion source box 18 can be predicted, output of the heater 28 can be corrected, and the temperature of the ion source box 18 can be kept constant. In this case, the correlation data holder 38 holds a correlation between any one of the magnitude of voltage applied to the filament 20, the magnitude of current flowing through the filament 20, and the magnitude of emission current immediately before the voltage application to the filament 20 is stopped and a correction amount of output of the heater 28, and when the voltage application to the filament 20 is stopped, output of the heater 28 is corrected using any one of the magnitude of voltage applied to the filament 20, the magnitude of current flowing through the filament 20, and the magnitude of emission current immediately before and the correlation held in the correlation data holder 38.

Note that the example described above is merely an example of the embodiment of the present invention. The embodiment of the gas chromatograph mass spectrometer according to the present invention is as described below.

The embodiment of the gas chromatograph mass spectrometer according to the present invention includes a gas chromatograph part configured to generate sample gas from an injected sample and to separate components in the sample gas from each other by a separation column, a mass spectrometer part including an ionization part for ionizing the components flowing out from an outlet of the separation column of the gas chromatograph part and a detection part for detecting the components ionized in the ionization part, and a controller configured to control at least the ionization part. The ionization part of the mass spectrometer part includes an ion source box having a space for ionizing the components flowing out from the outlet of the separation column in the inside, a heater for adjusting a temperature of the ion source box, and a filament that is arranged outside of the ion source box and generates an electron for ionizing the components flowing out from the outlet of the separation column, and the controller is configured, after applying voltage to the filament, to adjust a temperature of the ion source box affected by heat emitted from the filament to a predetermined temperature by controlling output of the heater in relation to magnitude of heat generation of the filament.

In a first aspect of the embodiment, a correlation data holder that holds correlation data between any of magnitude of voltage applied to the filament, magnitude of current flowing through the filament, and emission current which is an amount of electrons emitted from the filament, and a correction amount of output of the heater necessary for canceling influence of the filament on a temperature of the ion source box is included, and the controller is configured to correct output of the heater so as to cancel influence of the filament on a temperature of the ion source box using the correlation data held in the correlation data holder. According to such an aspect, since output of the heater is corrected before the temperature of the ion source box actually changes, temperature stability of the ion source box is improved.

In a second aspect of the embodiment, the controller is configured to start voltage application to the filament after flowing out of a solvent from the outlet of the separation column is completed. According to such an aspect, it is possible to prevent the filament from being deteriorated by a vaporized solvent. Note that this second aspect can be combined with the first aspect.

In the second aspect, the controller may be configured to detect completion of flowing out of a solvent from the outlet of the separation column based on elapsed time from injection of a sample in the gas chromatograph part.

DESCRIPTION OF REFERENCE SIGNS

1: Gas chromatograph mass spectrometer
2: Gas chromatograph part
4: Mass spectrometer part
6: Control device
8: Injector
10: Sample vaporizing chamber
12: Separation column
14: Ionization part
16: Detection part
18: Ion source box
20: Filament
22: Emission electrode
23: Ammeter
24: Ionization power supply
26: Temperature sensor
28: Heater
30: Ion lens
32: Quadrupole filter
34: Ion detector
36: Controller
38: Correlation data holder

The invention claimed is:
1. A gas chromatograph mass spectrometer comprising:
a gas chromatograph part configured to generate sample gas from an injected sample and to separate components in the sample gas from each other by a separation column;
a mass spectrometer part including an ionization part for ionizing the components flowing out from an outlet of the separation column of the gas chromatograph part and a detection part for detecting the components ionized in the ionization part; and
a controller configured to control at least the ionization part, wherein the ionization part of the mass spectrometer part includes:

an ion source box having a space for ionizing the components flowing out from the outlet of the separation column therein;

a heater for adjusting a temperature of the ion source box; and a filament that is arranged outside of the ion source box and generates an electron for ionizing components flowing out from the outlet of the separation column, the controller is configured to perform feedback control of an output of the heater so that the temperature of the ion source box is adjusted to a predetermined temperature, and the controller is further configured, after an analysis starts and voltage is applied to the filament, to determine a correction amount of the output of the heater for cancelling temperature increasing of the ion source box due to heat from the filament based on a magnitude of current flowing through the filament, a magnitude of voltage applied to the filament, or a magnitude of emission current, and to correct the output of the heater, which is based on the feedback control, using the correction amount.

2. The gas chromatograph mass spectrometer according to claim 1, further comprising:

a correlation data holder that holds correlation data between any of the magnitude of voltage applied to the filament, the magnitude of current flowing through the filament, and the magnitude of emission current which is an amount of electrons emitted from the filament, and a correction amount of output of the heater necessary for canceling influence of the filament on a temperature of the ion source box, wherein the controller is configured to correct output of the heater so as to cancel influence of the filament on a temperature of the ion source box using the correlation data held in the correlation data holder.

3. The gas chromatograph mass spectrometer according to claim 1, wherein the controller is configured to start voltage application to the filament after flowing out of a solvent from the outlet of the separation column is completed.

4. The gas chromatograph mass spectrometer according to claim 3, wherein the controller is configured to detect completion of flowing out of a solvent from the outlet of the separation column based on elapsed time from injection of a sample in the gas chromatograph part.

* * * * *